US008059540B2

(12) United States Patent
Yong et al.

(10) Patent No.: US 8,059,540 B2
(45) Date of Patent: Nov. 15, 2011

(54) POLICY BASED AND LINK UTILIZATION TRIGGERED CONGESTION CONTROL (75) Inventors: Lucy Yong, Tulsa, OK (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 258 days.

(21) Appl. No.: 12/123,985

(22) Filed: May 20, 2008

(65) Prior Publication Data

US 2008/0291927 A1 Nov. 27, 2008

Related U.S. Application Data (60) Provisional application No. 60/940,333, filed on May 25, 2007.

(51) Int. Cl.
H04L 12/26 (2006.01)
(52) U.S. Cl. .......................... 370/232; 370/235
(58) Field of Classification Search ........................ None
See application file for complete search history.

(56) References Cited

U.S. PATENT DOCUMENTS

| | | | | |
|---|---|---|---|---|
| 5,991,266 | A * | 11/1999 | Zheng | 370/229 |
| 6,498,781 | B1 | 12/2002 | Bass et al. | |
| 6,839,767 | B1 * | 1/2005 | Davies et al. | 709/232 |
| 6,889,050 | B1 | 5/2005 | Willars et al. | |
| 6,948,000 | B2 * | 9/2005 | Desai et al. | 709/245 |
| 7,292,578 | B1 * | 11/2007 | Kerr et al. | 370/395.32 |
| 7,336,605 | B2 * | 2/2008 | Bruckman et al. | 370/230 |
| 2003/0156542 | A1 * | 8/2003 | Connor | 370/236 |
| 2003/0185249 | A1 * | 10/2003 | Davies et al. | 370/535 |
| 2003/0218977 | A1 * | 11/2003 | Pan et al. | 370/230 |
| 2004/0071086 | A1 | 4/2004 | Haumont et al. | |

(Continued)

FOREIGN PATENT DOCUMENTS

CN 1478364 2/2004

(Continued)

OTHER PUBLICATIONS

IEEE Standard, 802.3, "Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications", IEEE Computer Society, 2005, pp. 1-450.

IEEE Standard, 802.3, "Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications", IEEE Computer Society, 2005, pp. 451-810.

(Continued)

*Primary Examiner* — Gregory Sefcheck
*Assistant Examiner* — Ashley Shivers
(74) *Attorney, Agent, or Firm* — Conley Rose, P.C.; Grant Rodolph (57) ABSTRACT An apparatus comprising a plurality of ingress ports coupled to a plurality of upstream nodes, the ingress ports having an incoming data rate; and a plurality of egress ports coupled to the ingress ports and an aggregated link comprising a plurality of links, the aggregated link having a bandwidth capacity, wherein at least some of the upstream nodes reduce their data transfer rates to a rate greater than zero when the incoming data rate is greater than or about equal to the aggregated link's bandwidth capacity. Also disclosed is a network component comprising a processor configured to implement a method comprising varying a plurality of transmission rates at a rate greater than zero, wherein the transmission rates correspond to a plurality of nodes that send data over an aggregated link.

6 Claims, 4 Drawing Sheets

U.S. PATENT DOCUMENTS

| | | | |
|---|---|---|---|
| 2005/0185583 A1* | 8/2005 | Hosein | 370/232 |
| 2005/0276263 A1 | 12/2005 | Suetsugu et al. | |
| 2006/0209693 A1* | 9/2006 | Davari et al. | 370/232 |
| 2007/0041321 A1* | 2/2007 | Sasaki et al. | 370/235 |
| 2007/0115824 A1* | 5/2007 | Chandra et al. | 370/235 |

FOREIGN PATENT DOCUMENTS

| | | |
|---|---|---|
| CN | 1620068 | 5/2005 |

OTHER PUBLICATIONS

Foreign Communication From a Related Counterpart Application—International Search Report and Written Opinion, PCT/CN2008/071058, Sep. 4, 2008, 11 pages.

IEEE Standard, 802.1AB, "IEEE Standard for Local and Metropolitan Area Networks—Station and Media Access Control Connectivity Discovery," IEEE Computer Society, 2005, pp. 1-172.

* cited by examiner

| Service Instance ID | Port(s) |
|---|---|
| 1 | 2 |
| 2 | 3 |
| 3 | 2 |
| ⋮ | ⋮ |
| N | N |

POLICY BASED AND LINK UTILIZATION TRIGGERED CONGESTION CONTROL

CROSS-REFERENCE TO RELATED APPLICATIONS

The present application claims priority to U.S. Provisional Patent Application Ser. No. 60/940,333, filed May 25, 2007 by Lucy Yong et al., and entitled "Policy Based and Link Utilization Triggered Congestion Control," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through the network. The nodes may include routers, switches, bridges, or combinations thereof that transport the individual data packets or frames through the network. Traditionally, networks offered data services by forwarding data frames across the network without using pre-configured routes or bandwidth reservation on intermediate nodes, e.g. in a connectionless manner. Other networks may forward the data frames across the network along pre-configured routes or connection oriented paths, with each node along the route reserving bandwidth for the data frames. Mixed or hybrid networks can support both connectionless forwarding and connection oriented paths to deliver data services. In such networks, controlling traffic congestion at a node within the network can be a challenge.

Several solutions for traffic congestion exist. For example, the Institute of Electrical and Electronics Engineers (IEEE) 802.1 or 802.3 standard traffic congestion solution drops all packets marked as best effort packets first, and then drops other packets to reduce the traffic rate. Such a method is undesirable because the customer has to retransmit the packets that are dropped. Alternatively, traffic congestion may be controlled by signaling adjacent nodes to stop transmitting traffic, for instance using a "PAUSE" message or frame. However, such a method is undesirable because it may cause the network to oscillate its packet transmission rates, a condition known as network oscillation syndrome.

SUMMARY

In one embodiment, the disclosure includes an apparatus comprising a plurality of ingress ports coupled to a plurality of upstream nodes, the ingress ports having an incoming data rate; and a plurality of egress ports coupled to the ingress ports and an aggregated link comprising a plurality of links, the aggregated link having a bandwidth capacity, wherein at least some of the upstream nodes reduce their data transfer rates to a rate greater than zero when the incoming data rate is greater than or about equal to the aggregated link's bandwidth capacity.

In another embodiment, the disclosure includes a network component comprising a processor configured to implement a method comprising varying a plurality of transmission rates at a rate greater than zero, wherein the transmission rates correspond to a plurality of nodes that send data over an aggregated link.

In a third embodiment, the disclosure includes a method comprising monitoring a plurality of transmission rates for a plurality of nodes that send data over an aggregated link, wherein at least some of the transmission rates comprise a committed rate; monitoring a bandwidth capacity for the aggregated link; and controlling at least one transmission rate at a rate greater than zero to maintain a sum of the transmission rates less than or about equal to the bandwidth capacity.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for network traffic congestion control based incoming transmission rates and an aggregated link's bandwidth capacity. Specifically, a traffic rate may be controlled from at least one first node to a second node using an aggregated link coupled to the second node, such that the traffic rate accommodates the aggregated link's bandwidth capacity. In such a case, the traffic rates from each first node may be reduced, for example, when the aggregated link's bandwidth capacity is reduced due to loss of one of the links in the aggregated link or when traffic congestion is detected, e.g. when the combined incoming traffic rates meet or exceed the aggregated link's bandwidth capacity. The traffic rates may correspond to static traffic flow where variable rate traffic is received from the same nodes and across the same paths over time or to dynamic traffic flow where variable rate traffic is received from different nodes across different paths over time. The traffic congestion control system may comprise detection and signaling mechanisms to monitor traffic rates and changes in the aggregated link's bandwidth capacity, and to adjust the traffic rates for connection oriented paths and service instances.

Figure 1:
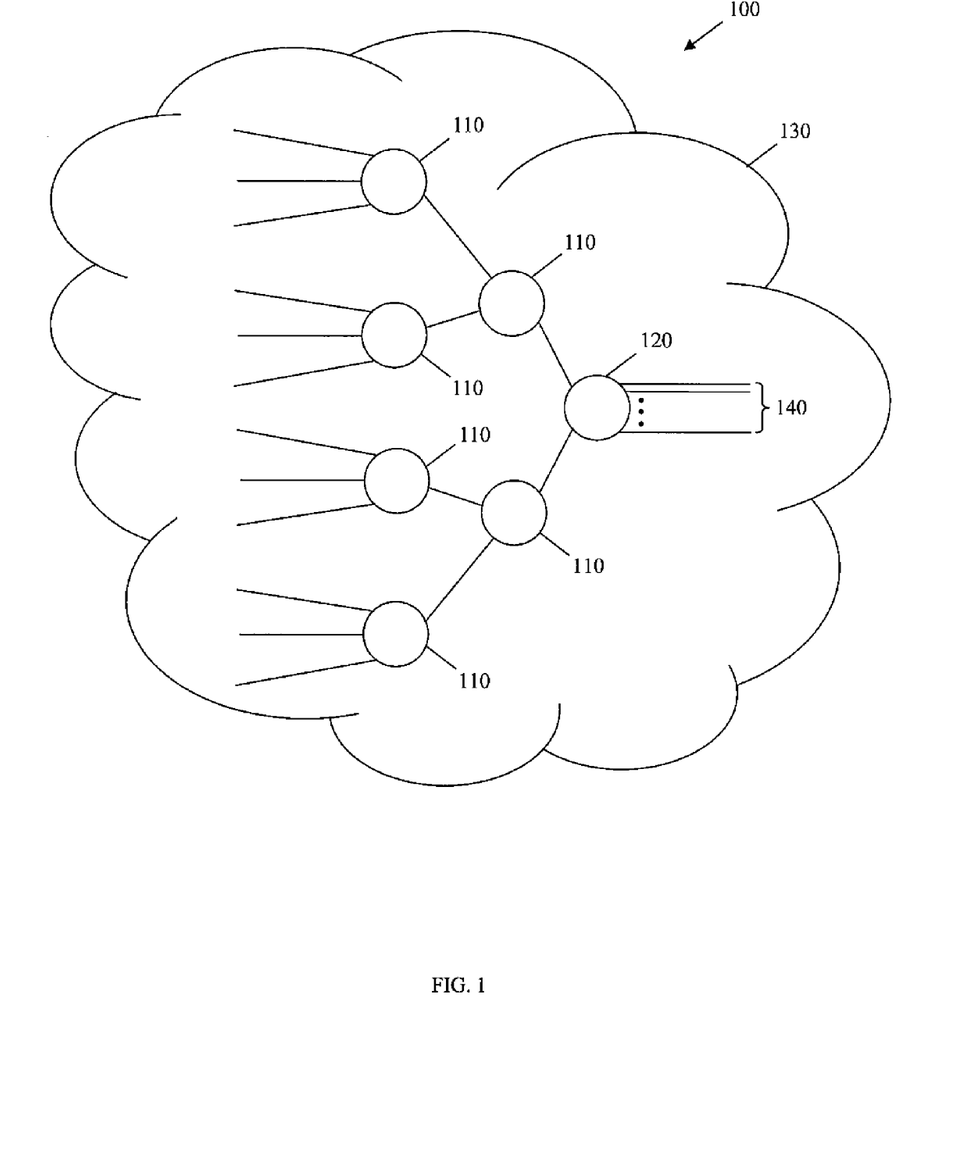
FIG. 1 is a schematic diagram of an embodiment of a traffic transport system with link aggregation.

FIG. 1 illustrates one embodiment of a system 100 that transports traffic from a plurality of nodes to another location using link aggregation. The system 100 comprises a plurality of first nodes 110, a second node 120, a network 130, and an aggregated link 140. It should be recognized that while FIG. 1 illustrates six first nodes 110, the network 130 may comprise any number of first nodes 110 coupled to the second node 120.

The first nodes 110 and the second node 120 may be any devices, components, or networks that may produce data, receive data, or both. The first nodes 110 and second node 120 may also pass the data streams onto or receive the data streams from other nodes that may exist in the network 130 or any external network coupled to the network 130. For example, the first nodes 110 and second node 120 may be routers, switches, or bridges, including backbone core bridges (BCBs), backbone edge bridges (BEBs), provider core bridges (PCBs), and provider edge bridges (PEBs). Alternatively, the first nodes 110 and second node 120 may be fixed or mobile user-oriented devices, such as desktop computers, notebook computers, personal digital assistants (PDAs), or cellular telephones.

The first nodes 110 may be coupled to the second node 120 and to each other in a branching configuration or a tree like topology as shown in FIG. 1, but may be alternatively configured in other network topologies (e.g. ring, line, mesh, etc.). In some other embodiments, for example, the second node 120 may be directly connected via a separate link to each of the first nodes 110 or to only one of the first nodes 110, which may be in turn coupled to the remaining first nodes 110 in some network topology.

Specifically, the first nodes may be any network nodes, including intermediate nodes and edge nodes, which may exchange data with each other and the second node 120 via network links. The network links may be any devices or media that transport data between a plurality of nodes. The network links may be physical (e.g. electrical or optical), virtual, and/or wireless connections that traverse at least part of the network 130. The network links may be a plurality of physical links that directly connect to the ports on the first nodes 110 and the second node 120. The second node 120 may be linked to the aggregated link 140, which is described in further detail below. Specifically, the second node 120 may comprise ingress ports that may be linked to at least one of the first nodes via at least one network link, and egress ports that may be linked to the aggregated link 140. The second node 120 may receive traffic from any of the first nodes 110 and forward the traffic via the aggregated link 140. In an embodiment, the second node 120 may be an intermediate node that forwards the traffic from the first nodes 110 to another node connected to the aggregated link 140. In another embodiment, the second node 120 may be an edge node that forwards the traffic from the first nodes 110 via the aggregated link 140 to another network in communication with the network 130.

The network 130 may be any communication system that may be used to transport data between first nodes 110 and second node 120. For example, the network 130 may be a wire-line network or an optical network, including backbone, provider, and access networks. Such networks typically implement Synchronous Optical Networking (SONET), Synchronous Digital Hierarchy (SDH), Ethernet, Internet Protocol (IP), Asynchronous Transfer Mode (ATM), or other protocols. Alternatively, the network 130 may be a wireless network, such as a Worldwide Interoperability for Microwave Access (WiMAX), cellular, or one of the IEEE 802.11 networks. The network 106 may transport traffic between the nodes 102 and 104 using virtual local area networks (VLANs), as described in IEEE 802.1Q. The traffic may comprise connectionless or switched traffic, also referred to as service instances or non-TE traffic, as described in IEEE 802.1ah. The traffic may also comprise connection oriented or bridged traffic, also referred to as Provider Backbone Bridge-Traffic Engineering (PBB-TE) traffic or TE traffic, as described in IEEE 802.1.

The aggregated link 140 may comprise a plurality of logically combined network links. The aggregated link 140 may be coupled to the second node 120 such that the network links in the aggregated link 140 may be individually coupled to the egress ports of the second node 120. A combination of a plurality of network links into a single logical link may be referred to as a link aggregation group (LAG). For example, two network links may be grouped together to form the aggregated link 140 and connected to the second node 120. When individual network links are aggregated, the bandwidth associated with the network links may also be aggregated. For example, if the aggregated link 140 comprises two network links each having a bandwidth of about one gigabit per second (Gbps), then the aggregated link 140 may have a bandwidth of about two Gbps. In embodiments, the link aggregation may conform to IEEE 802.3ad, which is a standard for link aggregation in Ethernet networks and is incorporated herein by reference as if reproduced in its entirety.

The aggregated link may allow its capacity to be increased with finer granularity than that of physical links. Specifically, technology upgrades typically result in capacity increases of an order of magnitude. For example, a first generation network link may provide a data rate of about one Gbps, while a second-generation network link may provide a data rate of about ten Gbps. If a first network link needs to be upgraded to about three Gbps, then upgrading the first network link to the second generation may produce about seven Gbps of unused bandwidth capacity. Instead, the aggregated link may include three additional first generation network links that are aggregated together to provide the required capacity. As such, link aggregation allows bandwidth capacity to be upgraded incrementally, and may be more cost effective than other upgrade solutions.

Link aggregation may also provide increased resilience by allowing multiple operational states. A single network link may be described as being in an operational state or "up" when the single network link operates at complete bandwidth capacity. Likewise, the single network link may be described as being in a non-operational state or "down" when the single network link is disconnected such that it does not have any bandwidth capacity or operates at partial bandwidth capacity. Furthermore, if an aggregated link includes two network links and each of the network links has an equal bandwidth capacity, then the aggregated link may be up when all of the network links are up, half up when one network link is up and the other network link is down, or down when all of the network links are down.

In the case when the aggregated link is partially up, e.g. in the case when one or some of the network links in the aggregated link are down, the aggregated link is said to have or incur a partial fault. Since, the aggregated link's bandwidth capacity may be about equal to the combined network links' bandwidths, the aggregated link's capacity may be reduced when partial faults occur as a result of the reduction of the combined network links' bandwidths.

Link aggregation may also provide transport resilience when an operator reserves some of the aggregated link's bandwidth capacity for individual link failure or fault protection. For instance, when one link in the aggregated link is down or fails, the aggregated link may transmit impacted traffic over the remaining individual links that may have some spare or reserved bandwidth capacity. As such, the failed link may not affect traffic transport over the aggregated link.

Figure 2:
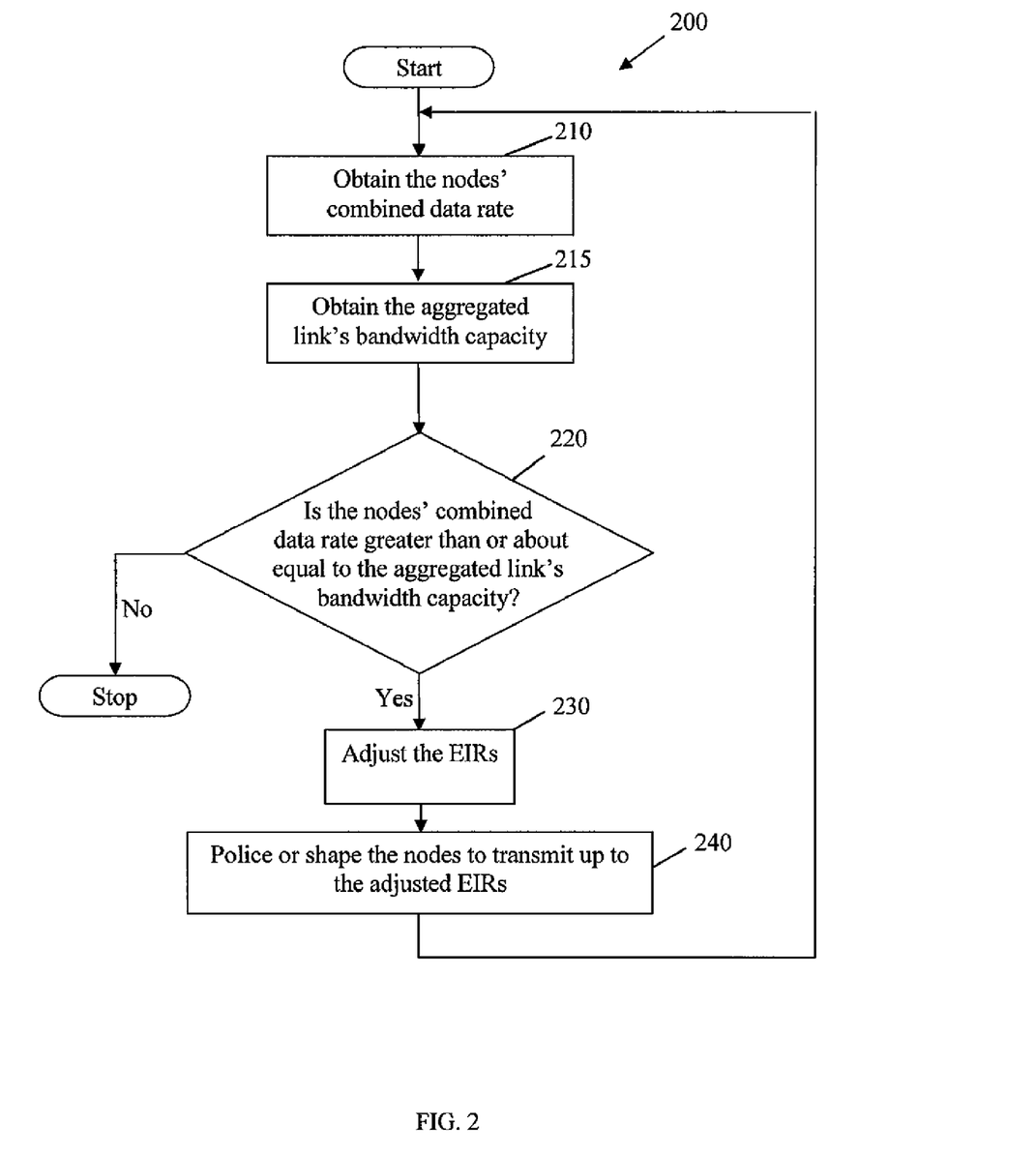
FIG. 2 is a flowchart of one embodiment of a traffic transport control method.

Some nodes, such as switches, may have the capability to control their transmission rates and may transmit data at a provisioned rate, referred to as a committed information rate (CIR), which may be guaranteed by a service provider. In addition, the nodes may be allowed to transmit data at a rate greater than the CIR, referred to as an excess information rate (EIR), which may comprise a rate portion exceeding the CIRs that is not guaranteed by the service provider. The method 200 may allow the EIRs at the nodes to be adjusted or reduced such that the nodes may be policed or shaped in transmitting traffic at the adjusted FIRs that is below its provisioned EIRS, but greater than the CIR, to guarantee that the aggregated link's bandwidth capacity may accommodate the combined EIRs or that the combined transmission rates may not exceed a congestion threshold.

The network 100 may experience a variety of traffic profiles. For example, the network 100 may experience traffic flows from all the first nodes 110 to second node 120. Such traffic flows occur when variable-rate traffic is being transported from the same nodes to the aggregated link across the same paths over a period of time. The network 100 may also experience some of the traffic flows from some of the first nodes 110 to the second node 120 and some of the traffic flows from other nodes not to the second node 120. This transport situation is referred to as dynamic traffic flow. The dynamic traffic flow occurs when variable-rate traffic is transported from a plurality of nodes and across a set of paths, where the nodes, the paths, or both may change over time. In some dynamic traffic flow situations, the nodes' information, including the node's addresses and the traffic flow paths, may be provisioned or established beforehand, as is the case in connection oriented paths. In other dynamic traffic flow situations, for example when the network supports service instances, the network 100 may control the transmission rates of service instance traffic flows that are forwarded without using pre-configured routes or bandwidth reservation.

FIG. 2 illustrates an embodiment of a method 200, which may be implemented to control the transmission rates in a plurality of network nodes coupled to an aggregated link. The method 200 may be implemented on a continuous basis at the node coupled to the ingress of an aggregated link or at any other network node communicating with the aggregated link. In some embodiments, the method 200 may be implemented at a network controller or management entity.

At block 210, the method 200 may determine the sum of transmission rates from the upstream nodes. The nodes' transmission rates may include the nodes' EIR, CIR, or both, and may be obtained by signaling or sending a message to the nodes coupled to the aggregated link to request their transmission rates. For instance, the method 200 may use a supported signaling protocol to obtain the node's transmission rates. In an embodiment, the EIRs as well as the CIRs assigned to each node in the network may be stored at the nodes or in a database. Alternatively, the FIRs and CIRs may be queried by the network nodes via signaling.

In an embodiment, the method 200 may calculate the sum of the EIRs corresponding to the individual nodes that send traffic to the aggregated link. Alternatively, the method 200 may add the sum of the CIRs corresponding to the nodes having transmission rates about their CIRs to the sum of the transmission rates corresponding to the nodes having transmission rates below their CIRS, which may be illustrated as:

$$\text{sum of CIRs(for nodes with transmission rates>CIRs)+sum of transmission rates(for nodes with transmission rates<CIRs).} \quad (1)$$

Further in the alternative, the method 200 may add the sum of the transmission rates of the sum of the EIRs at all the nodes sending traffic to the aggregated link regardless of the service instances associated with the nodes In the case of service instance dynamic traffic flow, the service instances comprising the traffic flow across the nodes may be monitored by some of the nodes, such as some Ethernet or IP switches. For instance, a plurality of service VLANs (SVLANs) comprising Ethernet traffic may be monitored by some of the nodes that are coupled to the aggregated link and transport the Ethernet traffic. Additionally or alternatively, the nodes may monitor a plurality of backbone VLANs (BVLANs) comprising each a plurality of SVLANs as describe in IEEE 802.1ah, for example. Similarly, a plurality of virtual privacy network identifiers (VPN-IDs) may be monitored by some of the nodes coupled to the aggregated link in an IP network.

Figure 3:
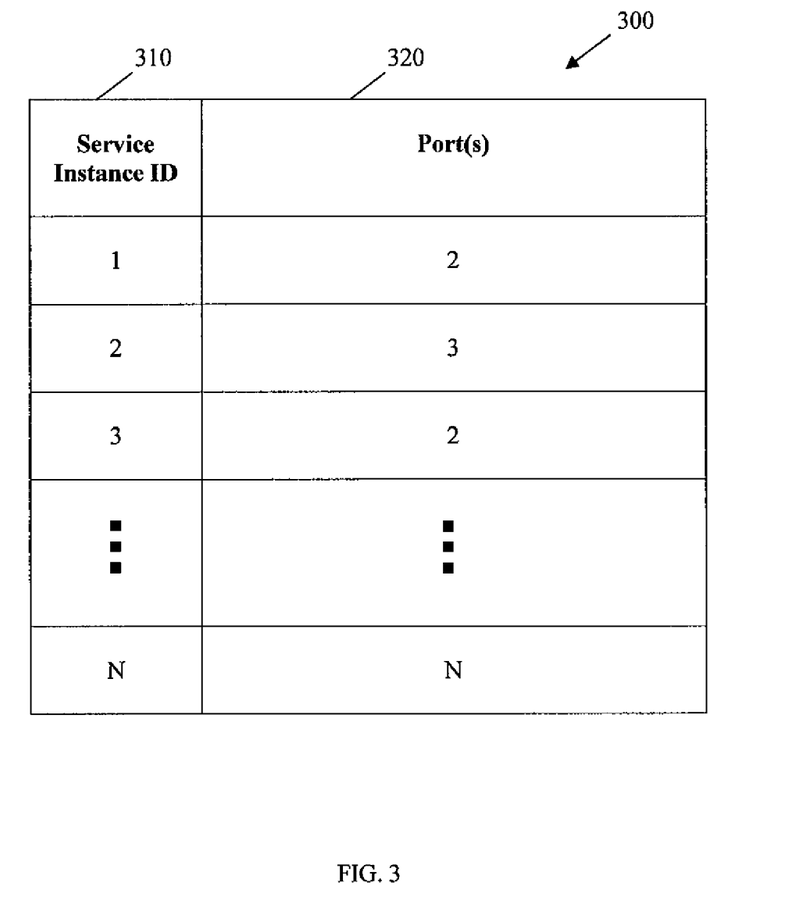
FIG. 3 is an illustration of an embodiment of an association table.

In an embodiment, the method 200 may obtain the transmission rates from an association table used to monitor the service instances. FIG. 3 shows an association table 300 that illustrates an embodiment of service instance information that may be used to monitor the service instances. The association table 300 may be stored at any or some of the nodes coupled to the aggregated link or at any other location within the network. Specifically, the association table 300 may be used to store the information needed to track the individual service instances across the network nodes. For instance, each service instance may be assigned a service instance identifier (ID) that distinguishes the service instance from other service instances in the network, as indicated in column 310. The service instance information may comprise the node's ports that are associated with the service instances and transport the service instance traffic, as indicated in column 320. For example, different service instances may be transported at a single node using the same ports. Hence, different service IDs in the association table 300 may be associated with the same port numbers or addresses.

In other embodiments, the association table information may comprise the paths or links identifiers between the nodes associated with the service instances (not shown in FIG. 3). The association table information may also comprise the transmission rates, the CIRs, the EIRs, or combinations thereof at each port, node, or path associated with the service instances. The association table 300 may be pre-configured by a network provider or updated when the service instances are modified by an operator.

Returning to FIG. 2, the method 200 may determine the aggregated link's bandwidth capacity at block 215. The aggregated link's bandwidth capacity may be equal to the sum of the individual links' capacities in the aggregated link. As part of the determination, the method 200 may detect any faults in the individual links that may result in reducing the bandwidth capacity of the aggregated link. In an embodiment, link faults may be detected via signaling the node coupled to the aggregated link or the controller or management entity, for example, when a link fails. In another embodiment, link faults may be detected by periodically monitoring the transmission rate at the aggregated link and comparing the transmission rate to some established normal condition rate or bandwidth level.

At block 220, the method 200 may compare the combined transmission rates with the aggregated link's bandwidth capacity. If the nodes' combined transmission rate is the sum of the EIRs corresponding to the individual nodes that send traffic to the aggregated link, then the method 200 may compare such with the aggregated link's bandwidth capacity. If the nodes' combined transmission rate is the sum of the nodes' actual transmission rates, then the method 200 may compare such to the aggregated link's bandwidth capacity. If the nodes' transmission rate is the sum of the CIRs corresponding to the nodes having transmission rates about their CIRs to the sum of the transmission rates corresponding to the remaining nodes, then the method 200 may compare such to the aggregated link's bandwidth capacity. If the nodes' transmission rate is the sum of the transmission rates of the sum of the FIRs at all the nodes sending traffic to the aggregated link regardless of the service instances associated with the nodes, then the method 200 may compare such to the aggregated link's bandwidth capacity. In such a case, the method 200 may not require the service instance information or the use of an association table. In any event, the method 200 may control the transmission rates of some or all the nodes using a simpler implementation or algorithm than when considering the individual service instances' contributions to traffic congestion at the aggregated link.

Additionally or alternatively, the method 200 may determine whether the transmission rate at the aggregated link has reached a congestion threshold at block 220. The congestion threshold may be at about equal to the aggregated link's bandwidth capacity or to a percentage of the bandwidth capacity, such as about 70, about 80, or about 90 percent. As such, the method 200 may periodically monitor the transmission rate at the aggregated link, compare the transmission rate to the congestion threshold, and signal the node coupled to the aggregated link when the transmission rate is about equal to or exceeds the congestion threshold.

The method 200 may proceed to block 230 when the condition at block 220 is met, e.g. when the nodes' combined transmission rate is greater than or about equal to the aggregated link's bandwidth capacity or the threshold. Otherwise, the method 200 may end. In some embodiments, the method 200 may continue to periodically monitor the aggregated link's bandwidth capacity and the sum of transmission rates from the upstream nodes when the condition at block 220 is not met, until instructed by an operator to end.

At block 230, the method 200 may adjust the EIRs based on a policy, perhaps determined by the network operator or the service provider. In an embodiment, adjusting the EIRs may comprise reducing the EIRs to transmission rates below their actual or current transmission rates. In another embodiment, the method 200 may adjust the EIRs by dividing or distributing the aggregated link's bandwidth capacity among all upstream nodes or ingress ports. For instance, when congestion has been reached at the aggregated link, the method 200 may adjust the EIRs corresponding to the upstream nodes or ingress ports by calculating and establishing reduced or adjusted EIRs (aEIR).

In an embodiment, the aEIRs may be calculated by dividing the bandwidth that exceeds the sum of CIRS, of the upstream nodes or ingress ports, among the upstream nodes or ingress ports, which can be represented by the following equation:

$$aEIRi=(\lambda\%\times\text{aggregated link's bandwidth capacity}-\text{sum of CIR transmission rates})/\text{number of nodes}+CIRi, \quad (2)$$

where aEIRi and CIRi correspond to the adjusted EIR and CIR of node i, respectively, and λ % may be a percentage value that represents the operated bandwidth ratio to the aggregated link's bandwidth capacity. For instance, λ % may be equal to about 80 percent, about 85 percent, about 90 percent, or about 95 percent. In some embodiments, the operated bandwidth of an aggregated link may be equal to the aggregated link's bandwidth capacity, e.g. λ % may be equal to about 100 percent.

In another embodiment, the EIRs may be adjusted to allow each upstream node or ingress port to transmit traffic at a rate equal to a percentage above the node's or port's CIR. As such, the bandwidth capacity may be distributed about proportionally among the upstream nodes or ingress ports, which can be represented by the following equation:

$$aEIRi=((\lambda\%\times\text{aggregated link's bandwidth capacity}/\text{sum of CIR transmission rates})-1) * CIRi, \quad (3)$$

where, similarly, aEIRi and CIRi correspond to the adjusted EIR and CIR of node i, respectively, and λ% may be a percentage value that represents the operated bandwidth ratio to the aggregated link's bandwidth capacity.

At block 240, the method 200 may provision the nodes to transmit traffic at a rate about equal to or less than the aEIRs. For instance, a node coupled to the aggregated link, the controller or management entity may send a message to the nodes comprising the provisioned rates. In one embodiment, the message may be "PAUSE" frame comprising the provisioned rates or the rate reductions allocated to the nodes. The provisioned rates may be greater than zero, such that the nodes may reduce their traffic rates but not completely stop transmission of data to the aggregated link. The method 200 may then return to block 210 to obtain the aggregated link's bandwidth capacity and the sum of transmission rates from the upstream nodes.

In an embodiment, the method 200 may adjust at least some nodes' EIR and allow the remaining nodes to transmit at unrestricted rates or at rates that do not exceed their EIRs. Specifically, the method 200 may reduce the transmission rates or the assigned EIRs at the nodes that may contribute more significantly to traffic congestion at the aggregated link. For instance, the method 200 may reduce the EIRs at the upstream nodes or ingress ports with transmission rates above their CIRS.

The method 200 may comprise an additional step (not shown in FIG. 2) to stop controlling the nodes' transmission rates when the transmission rate at the aggregated link no longer exceeds or reaches about the congestion threshold. For instance, when some nodes stop transmitting traffic or reduce their transmission rates, the condition at block 220 is not met. Thus, the method 200 may detect a reduction in the transmission rate at the aggregated link, and hence inform the nodes to transmit at unrestricted rates or to discard the aEIRs and transmit at about or below the initially assigned FIRs. For instance, a node coupled to the aggregated link, the controller or management entity may signal or send a message to the nodes to stop transmitting at a controlled rate.

In an embodiment of the method 200, when the condition at block 220 is not met, the method 200 may drop some of the packets transported from the nodes that are marked as best effort traffic without signaling or notifying the nodes or implementing block 240. In some embodiments, if the condition at block 220 is still not met after dropping the best effort traffic, the method 200 may then proceed to blocks 240 to adjust the EIRs and provision the nodes to transmit below or at about the aEIRs.

In another embodiment for controlling the transmission rates in the case of congestion at an aggregated link, the traffic rates may be identified by a plurality of individual SVLANs corresponding to an aggregated link, for example in Ethernet network. The network may be configured to control the traffic rates at any path or link where each traffic or service flow is associated with a unique SVLAN, and optionally a destination address (DA), a source address (SA), or both. The network controller may collect the actual data rates corresponding to each SVLAN (and optionally, DA, SA, or both) at each node and at the aggregated link. The network controller may use the association table information, for example, to track the nodes associated with each SVLAN. The controller may then compare the aggregated link's bandwidth capacity with the combined rates at the SVLANs. When the SVLANs combined rates reach about or exceed the aggregated link's bandwidth capacity, the network controller may control the transmission rates, as described above, at some of the SVLANs' associated nodes.

Figure 4:
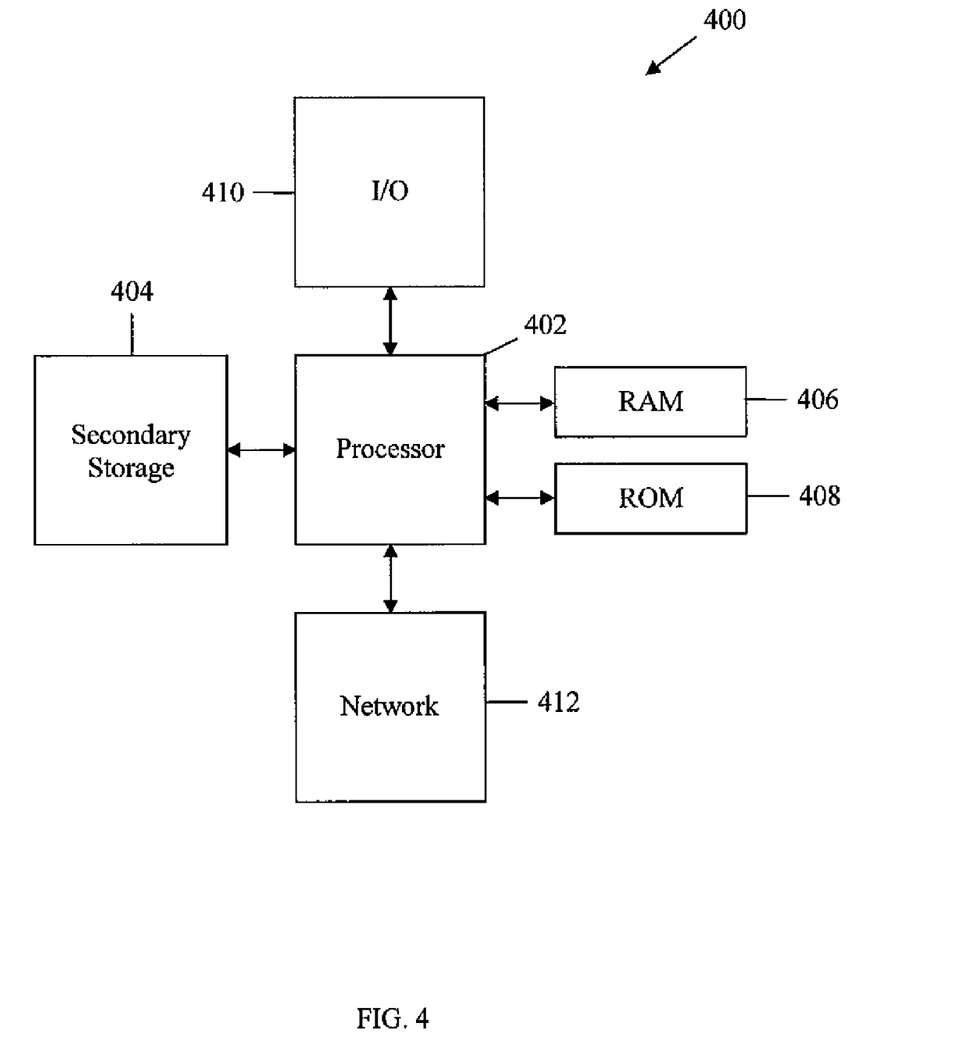
FIG. 4 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 4 illustrates a typical, general-purpose network component suitable for implementing one or more embodiments of a node disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a processor configured to vary a plurality of transmission rates at a rate greater than zero,
wherein each of the transmission rates correspond to one of a plurality of nodes that send data over an aggregated link,
wherein the aggregated link comprises a plurality of parallel links individually coupled to the network component and to a common destination node,
wherein each transmission rate is varied to an adjusted transmission rate by sending a message comprising the adjusted transmission rate to the corresponding node, and
wherein each adjusted transmission rate is related to each node's committed rate by:

$$aEIRi=((\lambda\% \times \text{the aggregated link's bandwidth capacity} - \text{the sum of the nodes' committed rates})/\text{the number of nodes})+CIRi,$$

where aEIRi is the adjusted transmission rate of node i, CIRi is the committed rate of node i, and $\lambda\%$ is a percentage value.

2. A network component comprising:
a processor configured to vary a plurality of transmission rates at a rate greater than zero,
wherein each of the transmission rates correspond to one of a plurality of nodes that send data over an aggregated link,
wherein the aggregated link comprises a plurality of parallel links individually coupled to the network component and to a common destination node,
wherein each transmission rate is varied to an adjusted transmission rate by sending a message comprising the adjusted transmission rate to the corresponding node, and
wherein each adjusted transmission rate is related to each node's committed rate by:

$$aEIRi=((\lambda\% \times \text{the aggregated bandwidth capacity}/\text{the sum of the nodes' committed rates})-1) \times CIRi,$$

where aEIRi is the adjusted transmission rate of node i, CIRi is the committed rate of node i, and $\lambda\%$ is a percentage value.

3. An apparatus comprising:
a plurality of ingress ports coupled to a plurality of separated upstream nodes, the ingress ports having an incoming data rate; and
a plurality of egress ports coupled to the ingress ports and to an aggregated link comprising a plurality of parallel links individually coupled to the egress ports and to a common destination node, the aggregated link having a bandwidth capacity,
wherein at least some of the upstream nodes reduce their data transfer rates to a rate greater than zero when the incoming data rate is greater than or equal to the aggregated link's bandwidth capacity,
wherein the incoming data rate comprises a plurality of committed information rates (CIRs) guaranteed by a provider, a plurality of adjustable excess information rates (EIRs) comprising a rate portion exceeding the CIRs, or both,
wherein at least some of the EIRs are adjusted using "PAUSE" frames comprising a rate reduction indication,
wherein the rate reduction indication is proportional to the difference between the aggregated link's bandwidth capacity and the incoming data rate,
wherein each EIR comprises an upstream node comprising a CIR, and wherein the rate reduction indication adjusts each EIRs to an adjusted transmission rate related to the corresponding upstream node's CIR by:

$aEIRi=((\lambda\% \times \text{the aggregated link's bandwidth capacity} - \text{the sum of the nodes' committed rates})/\text{the number of nodes})+CIRi,$ where aEIRi is the adjusted transmission rate of upstream node i, CIRi is the committed rate of upstream node i, and λ% is a percentage value.

4. An apparatus comprising:
a plurality of ingress ports coupled to a plurality of separated upstream nodes, the ingress ports having an incoming data rate; and
a plurality of egress ports coupled to the ingress ports and to an aggregated link comprising a plurality of parallel links individually coupled to the egress ports and to a common destination node, the aggregated link having a bandwidth capacity,
wherein at least some of the upstream nodes reduce their data transfer rates to a rate greater than zero when the incoming data rate is greater than or equal to the aggregated link's bandwidth capacity,
wherein the incoming data rate comprises a plurality of committed information rates (CIRs) guaranteed by a provider, a plurality of adjustable excess information rates (EIRs) comprising a rate portion exceeding the CIRs, or both,
wherein at least some of the EIRs are adjusted using "PAUSE" frames comprising a rate reduction indication,
wherein the rate reduction indication is proportional to the difference between the aggregated link's bandwidth capacity and the incoming data rate,
wherein each EIR comprises an upstream node comprising a CIR, and
wherein the rate reduction indication adjusts each upstream node's EIR to an adjusted transmission rate related to the upstream node's CIR by:

$aEIRi=((\lambda\% \times \text{the aggregated link's bandwidth capacity}/\text{the sum of the nodes' committed rates})-1) \times CIRi,$ where aEIRi is the adjusted transmission rate of upstream node i, CIRi is the committed rate of upstream node i, and λ% is a percentage value.

5. A method comprising:
monitoring a plurality of transmission rates for a plurality of nodes that send data over an aggregated link comprising a plurality of parallel links individually coupled to a common source node and to a common destination node, wherein at least some of the nodes comprise a committed rate;
monitoring a bandwidth capacity for the aggregated link;
detecting a condition wherein a sum of the transmission rates is greater than or equal to the bandwidth capacity for the aggregated link; and
responsive to detecting the condition, varying at least one transmission rate to an adjusted transmission rate by sending a message comprising the adjusted transmission rate to the corresponding node, wherein the adjusted transmission rate is greater than zero,
wherein each adjusted transmission rate is related to each node's committed rate by:

$aEIRi=((\lambda\% \times \text{the aggregated link's bandwidth capacity} - \text{the sum of the nodes' committed rates})/\text{the number of nodes})+CIRi,$ where aEIRi is the adjusted transmission rate of EIRi (i is an integer between 1 and N), CIRi is the committed rate associated with EIRi, and λ% is a percentage value.

6. A method comprising:
monitoring a plurality of transmission rates for a plurality of nodes that send data over an aggregated link comprising a plurality of parallel links individually coupled to a common source node and to a common destination node, wherein at least some of the nodes comprise a committed rate;
monitoring a bandwidth capacity for the aggregated link;
detecting a condition wherein a sum of the transmission rates is greater than or equal to the bandwidth capacity for the aggregated link; and
responsive to detecting the condition, varying at least one transmission rate to an adjusted transmission rate by sending a message comprising the adjusted transmission rate to the corresponding node, wherein the adjusted transmission rate is greater than zero,
wherein each adjusted transmission rate is related to each node's committed rate by:

$aEIRi=((\lambda\% \times \text{the aggregated link's bandwidth capacity}/\text{the sum of the nodes' committed rates})-1) \times CIRi,$ where aEIRi is the adjusted transmission rate of node i, CIRi is the committed rate of node i, and λ% is a percentage value.

* * * * *